(12) United States Patent
Piramanayagam et al.

(10) Patent No.: US 6,699,332 B1
(45) Date of Patent: Mar. 2, 2004

(54) METHOD OF PRODUCING A MAGNETIC RECORDING MEDIUM

(75) Inventors: Seidikkurippu N. Piramanayagam, Singapore (SG); Jian Ping Wang, Singapore (SG)

(73) Assignee: Data Storage Institute, Singapore (SG)

( * ) Notice: Subject to any disclaimer, the term of this patent is extended or adjusted under 35 U.S.C. 154(b) by 268 days.

(21) Appl. No.: 09/712,623

(22) Filed: Nov. 13, 2000

(30) Foreign Application Priority Data

Jul. 17, 2000 (SG) .......................................... 200003966

(51) Int. Cl.$^7$ ................................................ H01F 1/00
(52) U.S. Cl. ...................... 148/121; 427/127; 427/129; 427/130; 427/552; 252/62.56; 252/62.57; 252/62.63
(58) Field of Search ........................ 148/121; 427/127, 427/130, 129, 552; 252/62.56, 62.57, 62.63; 106/456, 459, 461

(56) References Cited

U.S. PATENT DOCUMENTS

| | | | |
|---|---|---|---|
| 4,347,086 A | * | 8/1982 | Chraplyvy et al. ......... 148/101 |
| 4,871,582 A | * | 10/1989 | Miyabayashi ............... 427/554 |
| 5,693,426 A | | 12/1997 | Lee et al. .................... 428/611 |
| 5,705,234 A | * | 1/1998 | Yamamoto et al. ......... 427/540 |
| 6,500,497 B1 | * | 12/2002 | Wang et al. ................. 427/528 |

FOREIGN PATENT DOCUMENTS

| | | | |
|---|---|---|---|
| EP | 0797192 A1 | 9/1997 | |
| EP | 0994465 A1 | 4/2000 | |
| JP | 60-191024 | * 9/1985 | ............. 252/62.56 |
| WO | WO9837553 | 8/1998 | |

* cited by examiner

*Primary Examiner*—John Sheehan
(74) *Attorney, Agent, or Firm*—Crowell & Moring, LLP

(57) ABSTRACT

A method of producing a magnetic recording medium comprising the steps of providing a substrate having a layer of a non-magnetic material that can be converted into a magnetic state by annealing, and then converting selected portions of the non-magnetic layer to a magnetic state by subjecting them to annealing by directing a focussed beam of radiation onto the substrate to form a patterned magnetic layer comprising an ordered array of magnetic regions separated by non-magnetic regions.

23 Claims, 3 Drawing Sheets

100 Gbit/in² medium     1000 Gbit/in² medium

METHOD OF PRODUCING A MAGNETIC RECORDING MEDIUM

This application claims priority to Singapore patent application No. 200003966-9 filed Jul. 17,2000, entitled METHOD OF PRODUCING A MAGNETIC RECORDING MEDIUM, which is hereby incorporated by reference.

The present invention relates to a method of converting a non-magnetic material into a magnetic state by annealing, and to a method of producing a magnetic recording medium such as a hard disk, particularly a patterned magnetic nanostructured medium for magnetic recording applications.

Conventionally, a magnetic recording medium for a hard disk is produced by sputter depositing a Co-alloy thin film on a chromium-based underlayer, as disclosed for example in U.S. Pat. No. 5,693,426.

The term "underlayer" refers to a layer of thin film, which Is deposited below the magnetic layer of a recording medium. The purpose of an underlayer is to provide favourable crystalline growth conditions for the magnetic layer and to achieve many useful recording properties. In the current magnetic recording materials, the underlayers are made of NiAl layer and a Cr Layer.

However, the magnetization vectors written on such disks lie in the plane of the film and are not stable at higher recording densities. Therefore, the current media are not expected to support densities higher than 300 Gb/in$^2$. Different alternatives such as perpendicular magnetic recording (in which the magnetization of the written bits lie perpendicular to the film and is more stable), or patterned structures of magnetic islands are sought for future high-density recording media.

A schematic view of a patterned media for a ultrahigh density of the order of 1000 Gb/in$^2$ is shown in FIG. 1. A substrate is provided comprising a layer of a non-magnetic material that can be converted into a magnetic state, and selected portions of the non-magnetic layer are converted into a magnetic state to produce an array of magnetic "islands" in a non-magnetic matrix.

Techniques such as electron beam lithography and laser interferometry have been employed for producing such magnetic islands. Nanostructures have also been fabricated using an atomic force microscope or a scanning tunneling microscope. However, these methods have not been suitable for mass production. With electron beam lithography, a number of processing steps are typically involved and the production rate is slow, and laser interferometry can be an impractical method when forming patterns over a wide area or on a circular disk.

It is an aim of the present invention to provide an alternative method for converting a non-magnetic material into its magnetic state, particularly in the production of a patterned magnetic recording medium.

According to a first aspect of the present invention, there is provided a method of converting a material into a magnetic state by annealing, wherein the annealing is carried out by directing a focussed beam of radiation onto the material.

According to a second aspect of the present invention, there is provided a method of producing a magnetic recording medium comprising the steps of providing a substrate having a layer of a non-magnetic material that can be converted into a magnetic state by annealing, and then converting selected portions of the non-magnetic layer to a magnetic state by subjecting them to annealing by directing a focussed beam of radiation onto the substrate to form a patterned magnetic layer comprising an ordered array of magnetic regions separated by non-magnetic regions.

The term "magnetic state" refers to state which exhibits ferromagnetism or ferrimagnetism, preferably at normal temperatures.

Examples of materials which are non-magnetic (i.e., they do not possess magnetization in a zero magnetic field) in the as-deposited state, and require high temperature annealing (typically 800° C.) to obtain the necessary crystalline structure in which the films become ferromagnetic or ferrimagnetic are Ba-ferrite, Sr-ferrite, Co-ferrite, garnets and CrPt3. Co. Co—Zn ferrites and Fe/Zr multilayer material undergo this transition at a lower temperature of 400° C. This class of materials are referred to as potentially magnetic materials.

Films of these materials have been annealed by subjecting the whole disk to heating at the required temperature such that the whole film becomes magnetic. However, disks prepared in this way have not yet been used for commercial production because they suffer from disadvantages such as relatively large grain size and relatively large noise.

With the method for producing a magnetic recording medium according to the present invention, the potentially magnetic material is locally heated using a focussed beam of radiation such as an electron beam or ion beam. Only the portion of the material exposed to the focussed beam of radiation undergoes a transformation of the crystal structure and is converted into the magnetic state. In this way, a tiny magnetic dot in a non-magnetic matrix can be obtained. By scanning pulses of the focussed beam of radiation over a layer of potentially magnetic material, an array of magnetic islands spread in a non-magnetic matrix can be produced.

Embodiments of the present invention are described hereunder, by way of example only, with reference to the accompanying drawings, in which.

Figure 1:
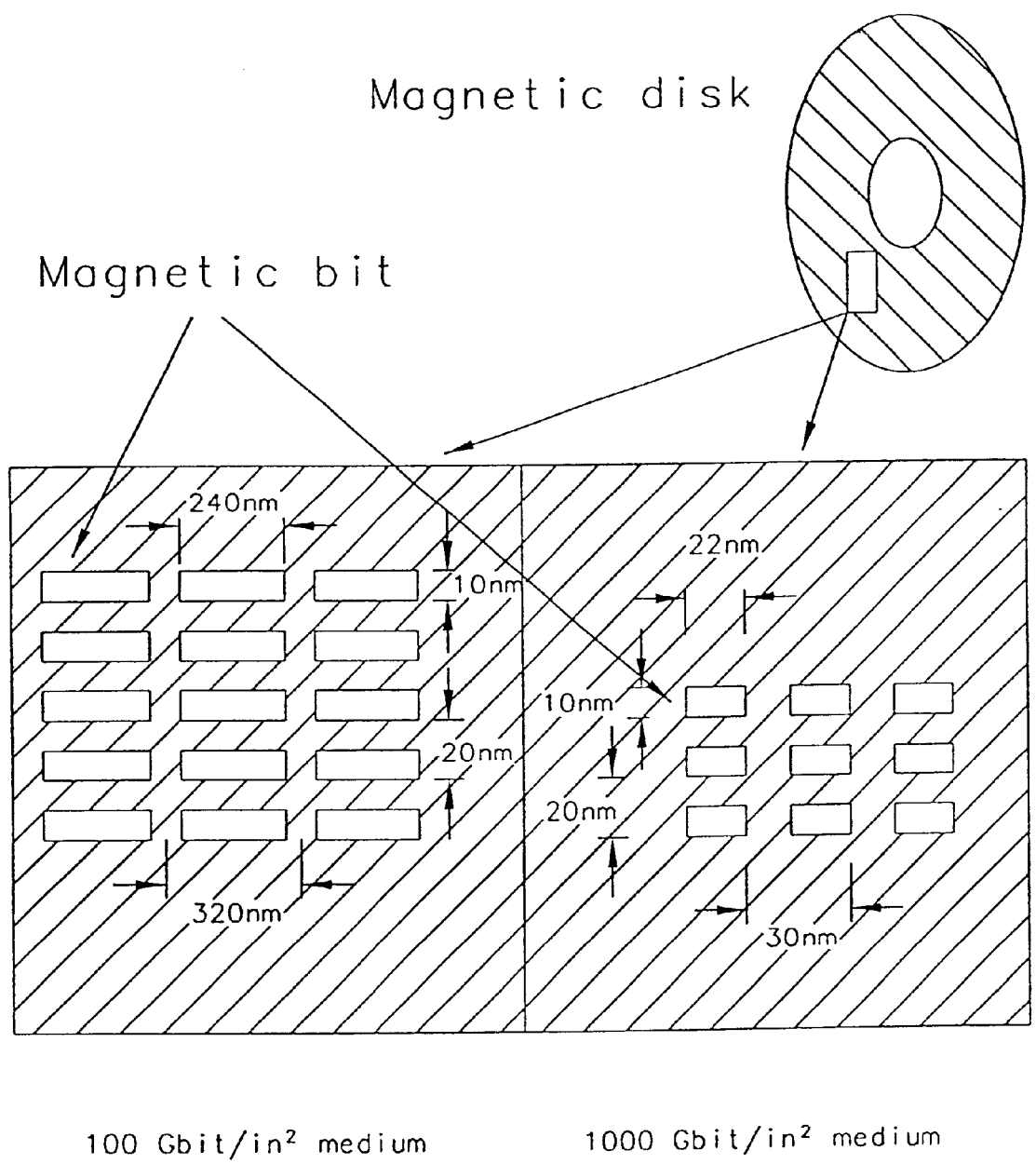
FIG. 1 is a schematic illustration of a high-density magnetic storage medium comprising a patterned magnetic layer, which can be prepared by the method of the present invention.
Figure 2:
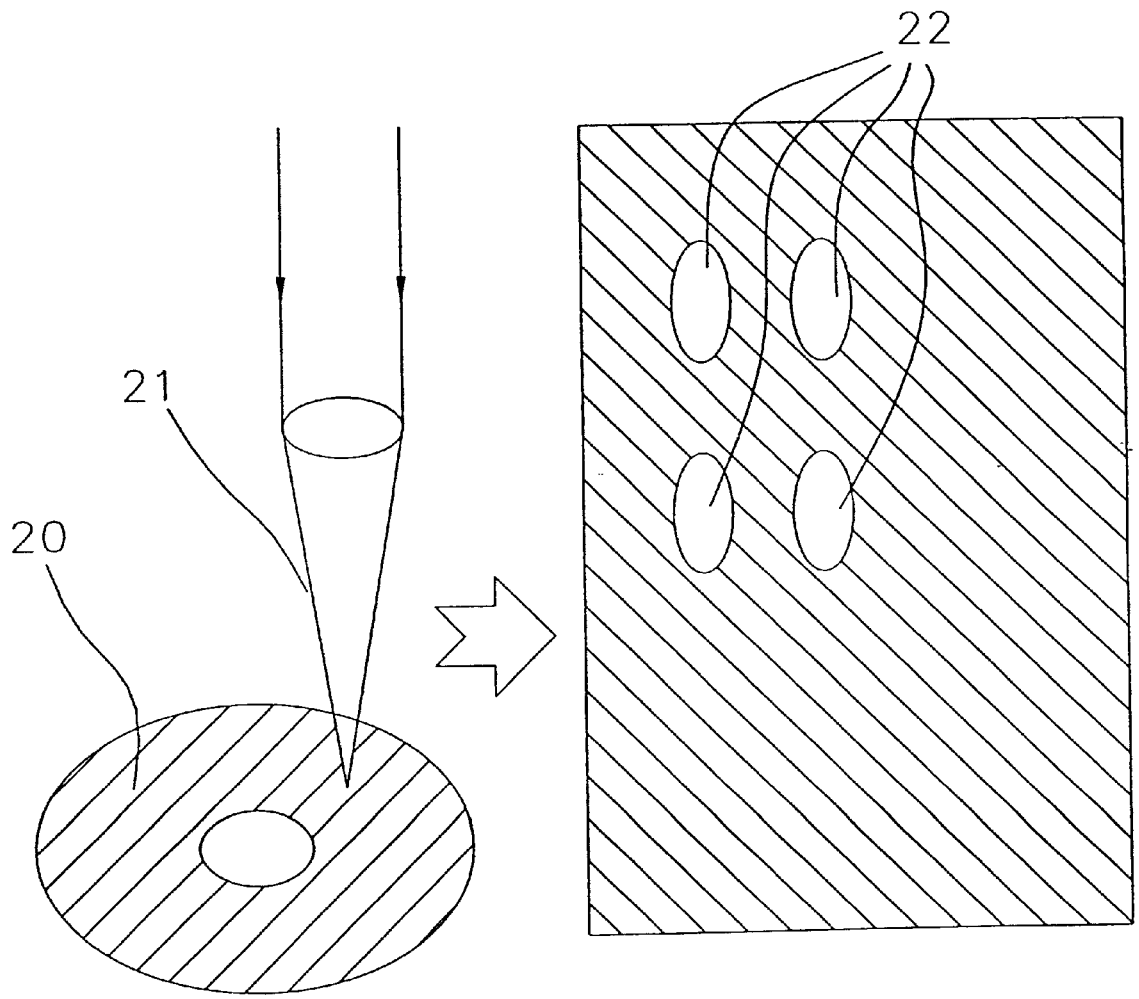
FIG. 2 is a schematic illustration of a method according to the present invention.
Figure 3:
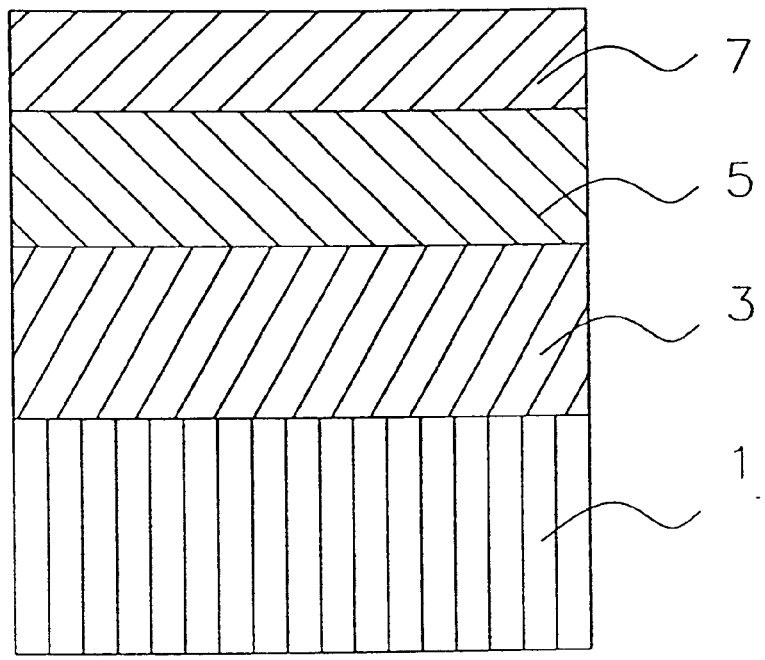
FIGS. 3(a) and 3(b) are schematic cross-sectional illustrations of examples of the structure of a magnetic medium which can be produced according to the method of the present invention.
Figure 3:
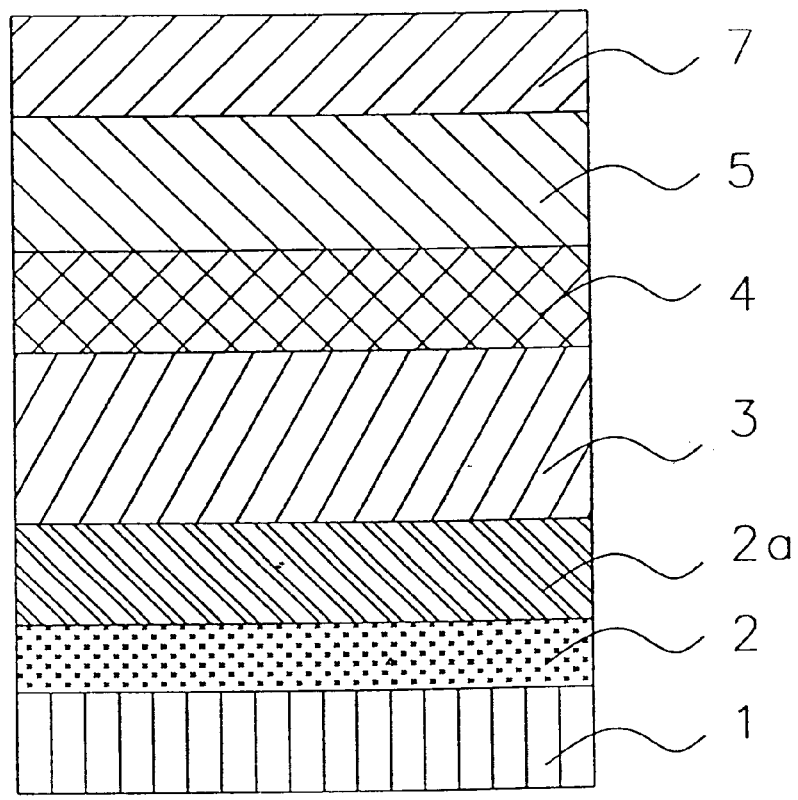

With reference to FIG. 2 and FIGS. 3(a) and 3(b), a disk shaped substrate comprises a base 1 provided with a surface thin layer 3 of a non-magnetic material that can be converted into a magnetic state by annealing. The substrate may also be provided with a seed layer 2 interposed between the base 1 and the non-magnetic layer 3 to stabilize the non-magnetic nature of the non-magnetic layer 3. Furthermore, an underlayer 2a may also be provided instead of or in addition to seed layer 2 to improve the magnetic properties of medium itself.

The disk-shaped substrate 20 is then rotated about its axis whilst scanning a focussed beam of radiation 21 across the disk in the radial direction. The focussing of the beam of radiation is done dynamically using a servomechanism. The beam is pulsed or modulated in such a way that as the disk substrate 20 is rotated and the beam 21 is scanned in the radial direction a desired array of portions of the non-magnetic layer are exposed to radiation having a sufficient energy to locally anneal those portions and produce an array of magnetic "islands" 22 in a non-magnetic matrix, as shown in FIG. 2. Each magnetic "spot" would typically have a diameter of about 20 nm.

The focussed beam of radiation can be produced by a laser or near-field optics. The term "near-field optics" refers to a technique in which the spot size can be reduced below the diffraction limits, to wave lengths below 200 nm.

The movement of the substrate is also controlled by a servomechanism.

After this treatment, the patterned magnetic layer 3 is coated with an overcoat layer 5 and a lubricant layer 7. Another metallic layer 4 may be inserted between the patterned magnetic layer 3 and the overcoat layer 5 in order to eliminate any static charge that may have developed on the surface of the pattered magnetic layer 3 in the case of charged particle irradiation.

The term "overcoat layer" refers to a layer of thin film, usually carbon, deposited above the magnetic layer of a recording medium. The purpose of an overcoat layer is to prevent the magnetic layer from corrosion and mechanical damage.

A disk fabricated this way can support very high density in the order of Terabits per square inch.

What is claimed is:

1. A method of producing a magnetic recording medium comprising the steps of providing a substrate having a layer of non-magnetic material that can be converted into a magnetic state by annealing, converting selected portions of the non-magnetic layer to a magnetic state by subjecting them to annealing by directing a focussed beam of radiation onto the substrate to form a patterned magnetic layer comprising an ordered array of magnetic regions separated by non-magnetic regions, modulating the focused beam of radiation to provide high energy pulses of an energy sufficient to anneal the non-magnetic material, and moving the substrate between incidence of the high energy pulses such that spaced apart portion of the substrate are exposed to the focused beam of radiation to form the patterned magnetic layer comprising an ordered array of magnetic regions separated by non-magnetic regions.

2. The method according to claim 1 wherein the ordered array of magnetic regions comprises a two-dimensional array of magnetic regions in a non-magnetic matrix.

3. The method according to claim 1 wherein a servo control is used to control the movement of the substrate.

4. The method of producing a magnetic recording medium according to claim 1, comprising modulating the focussed beam of radiation to provide high energy pulses of an energy sufficient to anneal the non-magnetic material; and directing the beam of radiation onto spaced apart portions of the substrate between incidence of the high energy pulses so as to form the patterned magnetic layer comprising an ordered array of magnetic regions separated by nonmagnetic regions.

5. The method according to claim 4 wherein a servo control is used to control the focussing of the beam.

6. The method according the claim 4 wherein the beam is directed between incident of the high energy pulses onto portions of the substrate spaced apart in a first direction, and further comprising the step of moving the substrate in a direction perpendicular to the first direction so as to form a two-dimensional array of magnetic regions separated by non-magnetic regions.

7. The method according to claim 6 wherein a servo control is used to control the focussing of the beam and the movement of the substrate.

8. The method according to claim 1 wherein the focussed beam of radiation is produced by a laser or near-field optics.

9. The method according to claim 1 where in the focussed beam of radiation is an X-ray beam, an electron beam, or an ion beam.

10. The method according to claim 1 wherein the non-magnetic material is a material which upon annealing is converted into Ba-ferrite or a substituted Ba-ferrite.

11. The method according to claim 1 wherein the non-magnetic material is a material which upon annealing is converted into Sr-ferrite or a substituted Sr-ferrite.

12. The method according to claim 1 wherein the non-magnetic material is a material which upon annealing is converted into Co-ferrite or a substituted Co-ferrite.

13. The method according to claim 1 wherein the non-magnetic material is a material which upon annealing is converted into garnet.

14. The method according to claim 1 wherein the non-magnetic material is a material which upon annealing is converted into $CrPt_3$ or materials of formula $(CrX)Y_3$, where X is Co, Ni, Fe, Mn or V, and Y is Pt or Pd.

15. The method according to claim 1 wherein the non-magnetic material comprises a $Ni_{1-x}P_x$ alloy.

16. The method according to claim 15 wherein the $Ni_{1-x}P_x$ alloy has been subject to elemental doping.

17. The method according to claim 1 wherein the non-magnetic material comprises a $Fe_{1-x}Cr_x$ alloy.

18. The method according to claim 1 wherein the non-magnetic material comprises a $Fe_{1-x}Pt_x$ alloy.

19. The method according to claim 1 wherein the non-magnetic material comprises a $Fe_{1-x}Zr_x$ alloy.

20. The method according to claim 1 wherein the non-magnetic material comprises a Fe/Zr multilayered structure.

21. The method according to claim 1 wherein the substrate comprises an underlayer over which the layer of non-magnetic material is formed.

22. The method according to claim 21 wherein the underlayer is a layer of Zr and the non-magnetic material is a $Fe_{1-x}Zr_x$ alloy.

23. The method according to claim 21 wherein the underlayer is a layer of Zr and the non-magnetic material is a Fe/Zr multilayered structure.

* * * * *